United States Patent [19]

Schnell

[11] 4,225,427
[45] Sep. 30, 1980

[54] SORTING APPARATUS FOR A STOCK SUSPENSION OBTAINED FROM WASTE PAPER

[75] Inventor: Hans Schnell, Mengen, Fed. Rep. of Germany

[73] Assignee: Escher Wyss GmbH, Wurttemberg, Fed. Rep. of Germany

[21] Appl. No.: 11,779

[22] Filed: Feb. 12, 1979

[30] Foreign Application Priority Data

Mar. 6, 1978 [CH] Switzerland ............... 2396/78

[51] Int. Cl.³ .............................................. B07C 5/00
[52] U.S. Cl. ............................... 209/44.1; 209/616; 209/906; 209/930; 162/55
[58] Field of Search ............. 209/615, 616, 906, 930, 209/297, 44.1; 241/21, 24, DIG. 38; 68/1; 162/4, 5, 55, 189, 191

[56] References Cited

U.S. PATENT DOCUMENTS

| | | | |
|---|---|---|---|
| 483,030 | 9/1892 | Volstorf | 209/297 X |
| 1,960,106 | 5/1934 | Grewin | 162/191 X |
| 2,340,511 | 2/1944 | Cowles | 209/615 X |
| 2,710,097 | 6/1955 | Bolles | 209/616 X |
| 3,597,308 | 8/1971 | Brooks | 162/55 X |
| 3,615,014 | 10/1971 | Hruby | 162/4 X |
| 3,814,336 | 6/1974 | Brewer | 241/DIG. 38 |
| 3,817,458 | 6/1974 | Gilberto | 241/24 X |
| 4,000,031 | 12/1976 | Acobas | 162/55 X |

Primary Examiner—Allen N. Knowles
Attorney, Agent, or Firm—Werner W. Kleeman

[57] ABSTRACT

A sorting apparatus for a stock suspension obtained from waste paper, comprising a separation container having a free liquid surface for the separation of heavy weight particles and floating particles. Arranged after the separation container is a segregating or separator container for the separation of large surface particles floating in the stock suspension. The removal of the particles can be accomplished by rake devices provided with tines or prongs or the like. There also can be subsequently arranged removal devices containing coarse-mesh and fine-mesh sieves.

5 Claims, 5 Drawing Figures

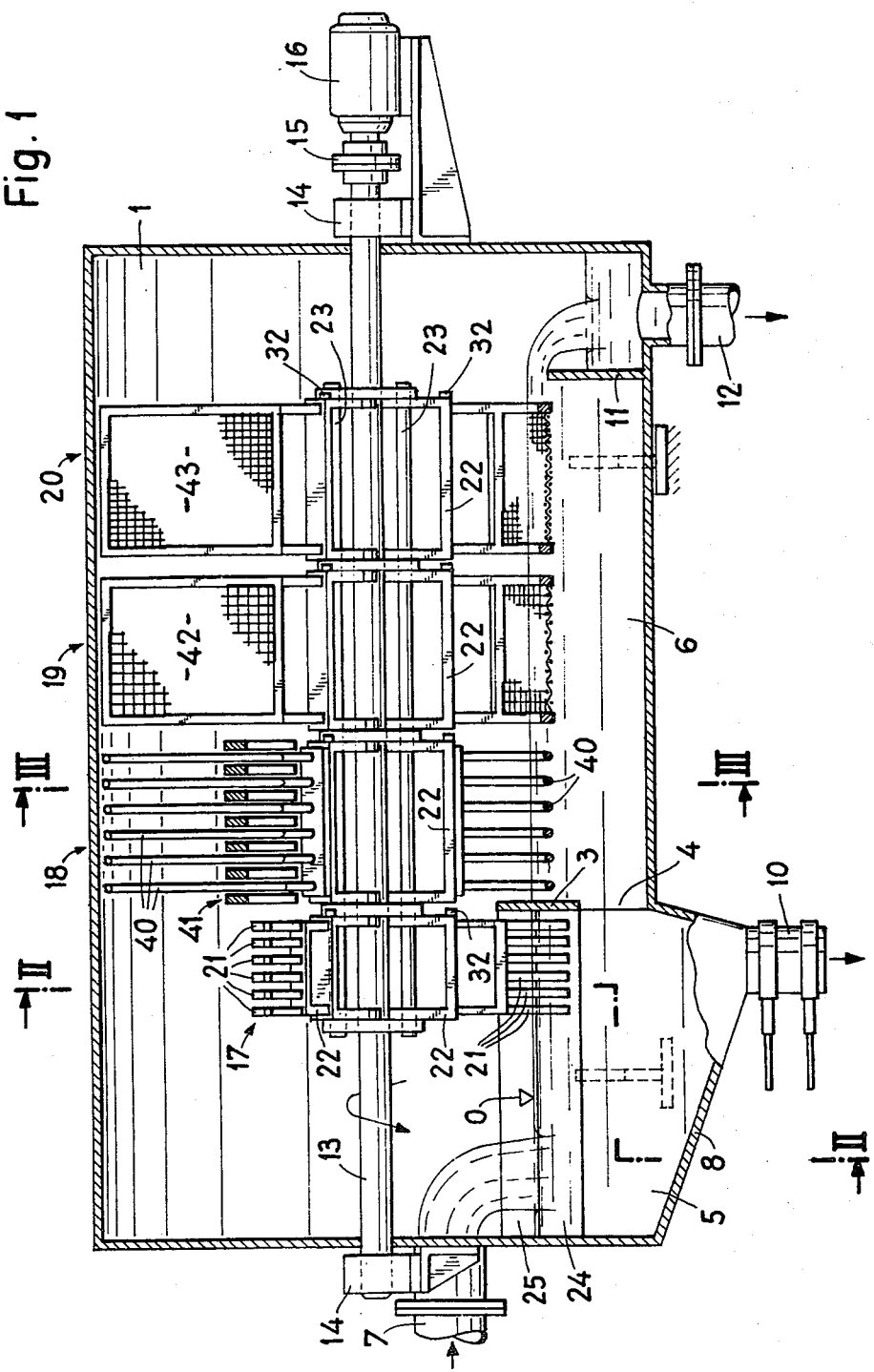

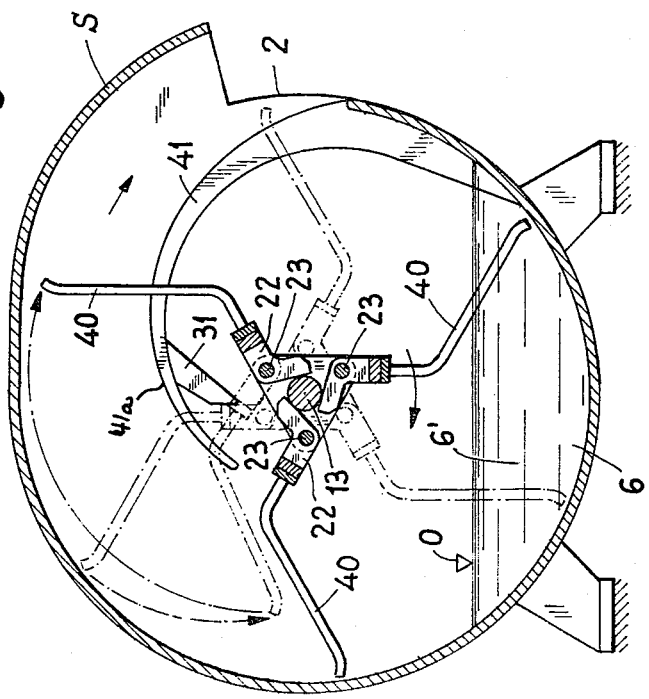
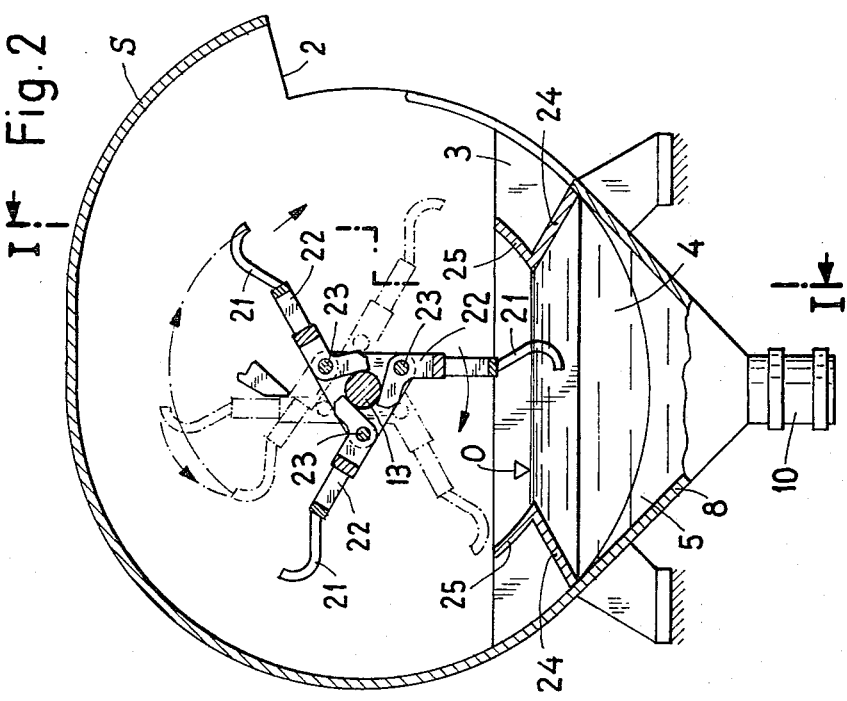

SORTING APPARATUS FOR A STOCK SUSPENSION OBTAINED FROM WASTE PAPER

BACKGROUND OF THE INVENTION

The present invention relates to a new and improved construction of sorting apparatus suitable for sorting stock suspensions obtained from waste paper, wherein there are successively removed heavy weight contaminants, floatable contaminants, such as, for instance, aerated plastics or foam materials, and large surface contaminants which are insoluble in water and suspended in the stock suspension, such as typically for instance plastic foils, textile pieces, ropes, cords and so forth.

SUMMARY OF THE INVENTION

It is a primary object of the present invention to provide a new and improved construction of sorting apparatus for a stock suspension obtained from waste paper which enables simplifying the present day employed installations needed for processing waste paper into new paper, and further, beneficially enables obtaining an appreciable reduction in the energy consumption.

Yet a further significant object of the present invention aims at providing a new and improved construction of sorting apparatus for a stock suspension obtained from waste paper, which sorting apparatus is relatively simple in construction and design, extremely reliable in operation, relatively economical to manufacture, not readily prone to breakdown or malfunction, and requires a minimum of maintenance and servicing.

Now in order to implement these and still further objects of the invention, which will become more readily apparent as the description proceeds, the sorting apparatus of the present development is manifested by the feature that there is provided a separation container located at an inlet through which there is delivered the stock suspension. This separation container has a free liquid surface and is provided with an inclined floor or bottom, at the lowest location of which there is arranged a delivery device for heavy weight particles. A removal device for the removal of floating substances or particles which float at the liquid surface in the separation container is arranged in such separation container. Following the separation container there is arranged, following a partition wall having an opening, a segregation or separator container which likewise possesses a free liquid surface. This subsequently arranged separator container is provided with at least one removal device for separating large surface particles or substances suspended in the stock suspension.

The removal device for the floating particles can comprise a rake device having tines or prongs or the like movable along the liquid surface. Equally, the removal device for the large surface particles which are suspended in the stock suspension can comprise a rake device likewise having tines or prongs or the like movable through the liquid of the subsequently arranged separator container. Due to this construction there is realized a particularly simple design of the removal devices.

Moreover, it is possible to enlarge the field of activity of the sorting apparatus of the invention, and equally to render possible the separate elimination of not completely dissolved paper pieces, by arranging in the segregation or separator container, following the removal device equipped with tines, a further removal device having coarse-mesh sieve means movable through the liquid compartment of such separator container.

A further facet of the invention contemplates arranging after the removal device equipped with the coarse-mesh sieve means a further removal device having fine-mesh sieve means which is movable through the liquid compartment of the related separator container and serves for the removal of the good stock fibres. In this way there is beneficially realized dewatering and thickening of the obtained good stock, something advantageous for further processing.

It is also contemplated to arrange the various removal devices at an essentially horizontal, rotatable shaft which extends along the liquid surface contained within the containers. Due to this arrangement there is realized an appreciable simplification of the system design by operatively interconnecting or grouping together the individual removal devices and their common drive.

A further aspect of the invention contemplates pivotably and resiliently connecting the removal elements of the removal devices with the shaft and having such coact with stop means in the manner of a propelling mechanism or catapult-type ejector. In this way the separated substances can be removed out of the equipment through the use of very simple means.

However, it should be understood that the removal devices also can be designed in a different manner, and, for instance, can be arranged upon transport belts or the like instead of upon a shaft.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a longitudinal sectional view through an exemplary embodiment of sorting apparatus, the section being taken substantially along the line I—I of FIG. 2;

FIG. 2 is a cross-sectional view of the sorting apparatus of FIG. 1, taken substantially along the line II—II thereof;

FIG. 3 is a cross-sectional view of the sorting apparatus of FIG. 1, taken substantially along the line III—III thereof.

DETAILED DESCRIPTION OF THE PREFERRED EMBODIMENTS

Figure 4:
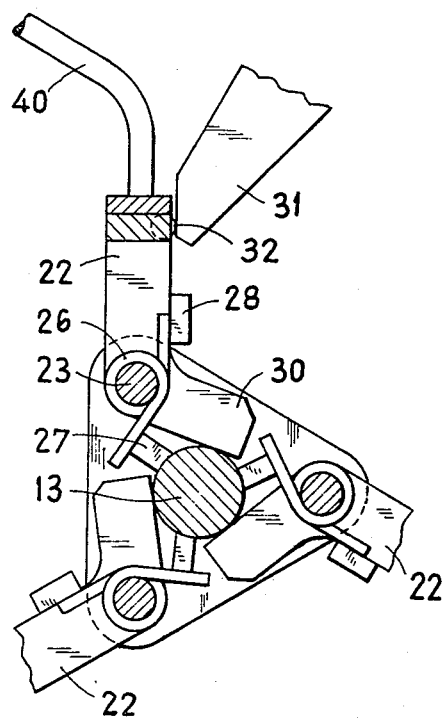
FIGS. 4 and 5 illustrate details of the ejection mechanism used with the sorting apparatus of FIGS. 1 to 3, showing the same in different positions.

Describing now the drawings, the sorting apparatus shown by way of example in FIGS. 1 to 3 will be seen to comprise a housing 1 having an essentially circular or round cross-section and equipped with an outfeed portion S forming one or a number of outfeed or ejection openings 2 or the like. The housing 1 is divided by means of a partition wall 3 having an opening 4 into a front separation container 5 and a subsequently located segregating or separator container 6. The separation container 5 is flow connected with an inlet line or conduit 7, by means of which there is infed to the sorting apparatus, for instance from a slusher or pulper, the stock suspension which has been obtained from waste paper. As will be readily apparent from the showing of FIGS. 1 and 2, the separation container 5 has an inclined floor or bottom 8, at the lowest location of which there is arranged a suitable discharge or delivery device 10, for instance a sluice, for the removal of the heavy weight contaminants, also referred to simply as the heavy contaminants.

The segregating or separator container 6, arranged downstream of the separation container 5, with respect to the direction of flow of the stock suspension, and whose cross-section will be apparent from the showing of FIG. 3, terminates at an essentially vertically extending wall 11 over which the stock suspension or liquid flows and reaches an outlet or discharge line or conduit 12.

As also seen by referring to FIGS. 1 to 3, a driven shaft 13 extends along the lengthwise axis of the housing 1. This shaft 13 is rotatably mounted in bearings 14 and is connected by means of a coupling 15 with a geared drive motor 16 or other suitable drive means.

Arranged upon the shaft 13 are contaminant-removal devices 17, 18, 19 and 20, the structure and function of which will be discussed more fully hereinafter.

The first removal device 17, located in the separation container 5, serves for the removal of the floating substances or particles, such as for instance, foam particles, which float upon the surface O of the liquid located in such separation container 5, and specifically, this removal operation occurs before such liquid moves through the opening 4 of the partition wall 3 into the separator container 6.

It has been found that the inventive sorting apparatus functions in an optimum fashion if the stock suspension within the separation container 5 and the segregating or separator container 6 has a consistency which amounts to less than 1.5%. In the first instance there is thus appreciably facilitated the deposition of heavy contaminants, such as for instance, sand and similar particles. Additionally, due to the foregoing there is also augmented the floating up of the light weight contaminants, also referred to simply as the light contaminants, such as the afore-mentioned aerated plastics or foam particles, wooden particles and the like.

The removal devices 18, 19 and 20 are arranged, with respect to the direction of flow of the stock suspension or liquid, in succession within the separator container 6. The first of these tandemly arranged removal devices 18, 19 and 20, namely the device 18 serves for the removal of large-surface particles which are suspended in the stock suspension and which are not soluble in water. These particles can be typically, for instance plastic foils, textile pieces, ropes, cords and so forth. The next removal device 19 serves for the removal of lumps of waste paper which have not completely dissolved. The last removal device 20 serves for the removal of good stock fibres from the last section or region of the separator container 6, and such removed good stock is concentrated and partially dewatered.

As particularly well seen by referring to FIG. 1, the removal device 17 for the floating substances or particles contains a rake device composed of movable tines or prongs 21 which are movable along the liquid surface O (FIG. 2). These tines or prongs 21, constituting removal elements, are attached to a frame or support structure 22 which is pivotably mounted upon the rods 23 or equivalent structure extending essentially parallel to the shaft 13. As will be also more readily explained hereinafter, and as best seen by referring to FIG. 3, the removal device 18 likewise contains tines or prongs 40 or the like, defining removal elements, and arranged in a similar fashion upon a frame 22 pivotably mounted at the parallel rods 23.

From the showing of FIG. 2 it will be seen that the separation container 5 is provided at it upper region with inclined, inwardly directed guide walls 24 having short cylindrical portions or sections 25 which are arranged essentially concentrically with respect to the driven shaft 13.

Figure 5:
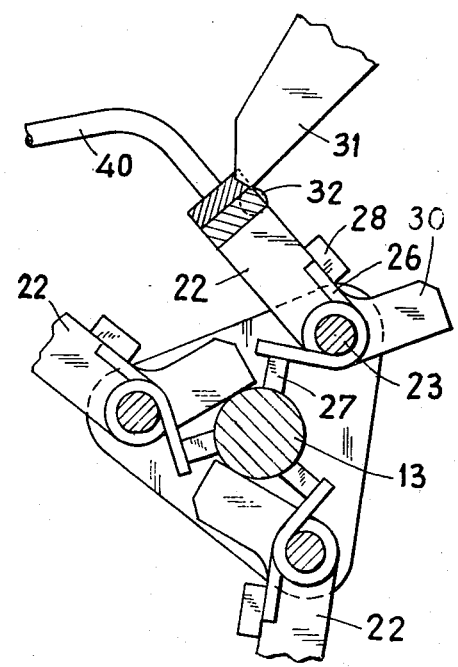

As best seen by referring to FIGS. 4 and 5, resilient elements, for instance in the form of suitable coil or spiral springs 26, are arranged upon the rods 23 which are attached at the shaft 13 and extend essentially parallel thereto. These springs 26 each will be seen to bear at one end against a related stop or impact element 27 attached to the shaft 13 and at their other end against a related stop or impact element 28 attached to the frame 22. These springs 26 bias the frame 22, in accordance with the illustration of FIG. 4, towards the right, i.e., in the clockwise direction, and specifically displaceably urge such frame 22 in such rotational sense until projections 30 formed or otherwise provided at the frame 22 impact against the shaft 13.

In order to bring about an ejection movement there are provided fixed stop or impact elements 31 in the housing 1, these fixed stops 31 only having been illustrated in the sectional showing of FIG. 3. The fixed stops or impact elements 31, in a suitable, predetermined position of each related frame 22, impact against a respective stop or impact element 32 of the frame 22. During further movement of the shaft 13, corresponding to the illustration of FIG. 4, the related frame 22, whose stop 32 has impacted against the impact element 31, is held back and pivoted, in relation to the shaft 13, in the counter-clockwise direction, i.e., rocked towards the left of the showing of FIG. 5. As soon as the stop 32 moves out of the operable region of the impact element 31, then the frame 22 together with its related tines or prongs propels towards the right of FIG. 5, and accordingly, likewise propels the particles which have been entrapped by the tines through the opening 2 towards the outside and into a not particularly illustrated catch container or transport device.

The removal devices 18, 19 and 20 function in the same manner. They differ from the removal device 17 only through the construction of their elements intended to immerse into the stock suspension or liquid.

Thus, the removal device 18 contains rake-like tines 40 which predominantly differ from the tines 21 of the removal device 17 in that such extend almost to the base or floor of the separator container 6. During their movement through the liquid compartment 6' of the separator container 6 these tines 40 can entrap the aforementioned large surface or surface-like contaminants and outwardly propel the same through the outfeed or discharge opening 2. The removal of the surface-like particles by the tines 40 can also be augmented by a scraper or stripper rake 41, as best seen by referring to FIG. 3, which is attached in the housing 1 and contains tines or bent flat elements 41a which engage between the tines or prongs 40 of the removal device 18.

As apparent from the showing of FIG. 1, the removal device 19, instead of being provided with tines 40, is equipped with a coarse-mesh sieve 42 or equivalent structure, whereas the removal device 20 has a fine-mesh sieve 43.

While there are shown and described present preferred embodiments of the invention, it is to be distinctly understood that the invention is not limited thereto, but may be otherwise variously embodied and practiced within the scope of the following claims.

What I claim is:

1. A sorting apparatus for stock suspensions obtained from waste paper, comprising:
   infeed means for the stock suspension;
   a separation container arranged at the region of said infeed means for receiving therein the infed stock suspension;
   said separation container having a free liquid surface of the stock suspension and an inclined floor;
   a delivery device for heavy particles arranged at the region of the lowermost point of said floor;
   a removal device for the removal of floating substances which float upon the liquid surface in the separation container;
   a separator container arranged after the separation container;
   a partition wall having an opening disposed between said separation container and said subsequently arranged separator container;
   said subsequently arranged separator container likewise having a free liquid surface of the stock suspension contained therein;
   at least one removal device provided for the separator container for the removal of large surface particles suspended in the stock suspension;
   the removal device for the suspended particles in the stock suspension and provided for the separator container comprises a rake device having tines movable through the liquid of said separator container;
   a removal device provided with coarse-mesh sieve means arranged after the removal device having the tines and arranged in the separator container;
   said separator container having a liquid compartment; and
   said removal device provided with the coarse-mesh sieve means being movable through the liquid compartment of said separator container.

2. The sorting apparatus as defined in claim 1, wherein:
   the removal device for the floating substances and provided for the separation container comprises a rake device having tines movable along the liquid surface of the stock suspension.

3. The sorting apparatus as defined in claim 1, further including:
   a removal device provided with fine-mesh sieve means arranged after the removal device provided with coarse-mesh sieve means;
   said removal device provided with said fine-mesh sieve means being movable through the liquid compartment of the separator container and serving for the removal of good stock fibers.

4. The sorting apparatus as defined in claim 3, further including:
   rotatable shaft means extending horizontally along the liquid surface of the stock suspension contained in said containers; and
   said removal devices being arranged at said rotatable shaft means.

5. The sorting apparatus as defined in claim 4, wherein:
   each of said removal devices has removal elements;
   means for pivotably and resiliently connecting the removing elements with said shaft means;
   stop means with which coact said removal elements for imparting thereto a propelling movement to thus form a propelling mechanism for each of the removal devices.

* * * * *